United States Patent [19]

Coeling et al.

[11] Patent Number: 5,443,796
[45] Date of Patent: Aug. 22, 1995

[54] METHOD AND APPARATUS FOR PREVENTING THE FORMATION OF A SOLID PRECIPITATE IN A COATING MATERIAL FORMULATION

[75] Inventors: Kenneth J. Coeling, Westlake; Laurence B. Saidman, Avon Lake; James C. Smith, Amherst; James W. Messerly, Stow; Stanley E. Mayer, Avon Lake, all of Ohio

[73] Assignee: Nordson Corporation, Westlake, Ohio

[21] Appl. No.: 963,075

[22] Filed: Oct. 19, 1992

[51] Int. Cl.$^6$ ............................................. C23F 11/00
[52] U.S. Cl. .................................... 422/129; 422/7; 106/14.05
[58] Field of Search ................... 422/7, 129; 106/14.05

[56] References Cited

U.S. PATENT DOCUMENTS

| | | |
|---|---|---|
| 1,483,225 | 2/1924 | Hammett . |
| 1,511,765 | 10/1924 | Latham . |
| 1,585,255 | 5/1926 | McFadden . |
| 3,025,464 | 3/1962 | Bond . |
| 3,133,437 | 5/1964 | Remke et al. . |
| 3,314,005 | 4/1967 | Whitener . |
| 3,751,644 | 8/1973 | Mayer . |
| 3,764,069 | 10/1973 | Runstadler, Jr. et al. . |
| 3,774,238 | 11/1973 | Hardway, Jr. . |
| 3,778,705 | 12/1973 | Maltby . |
| 3,933,285 | 1/1976 | Wiggins . |
| 4,059,466 | 11/1977 | Scholl et al. . |
| 4,059,714 | 11/1977 | Scholl et al. . |
| 4,156,754 | 5/1979 | Cobbs, Jr. et al. . |
| 4,174,498 | 11/1979 | Preikschat . |
| 4,181,881 | 1/1980 | Preikschat . |
| 4,193,745 | 3/1980 | Hamilton et al. . |
| 4,200,207 | 4/1980 | Akers et al. . |
| 4,247,581 | 1/1981 | Cobbs, Jr. et al. . |
| 4,259,402 | 3/1981 | Cobbs, Jr. et al. . |
| 4,288,741 | 9/1981 | Dechene et al. . |
| 4,301,119 | 11/1981 | Cobbs, Jr. et al. . |
| 4,371,096 | 2/1983 | Scholl et al. . |
| 4,405,063 | 9/1983 | Wydro et al. . |
| 4,407,431 | 10/1983 | Hutter, III . |
| 4,423,161 | 12/1983 | Cobbs, Jr. et al. . |
| 4,505,406 | 3/1985 | Cobbs, Jr. et al. . |
| 4,505,957 | 3/1985 | Cobbs, Jr. et al. . |
| 4,527,712 | 7/1985 | Cobbs, Jr. et al. . |
| 4,553,701 | 11/1985 | Rehman et al. . |
| 4,601,645 | 7/1986 | Schmitkons . |
| 4,627,465 | 12/1986 | Kolibas et al. . |
| 4,630,774 | 12/1986 | Rehman et al. . |
| 4,632,314 | 12/1986 | Smith et al. . |
| 4,654,802 | 3/1987 | Davis . |
| 4,657,047 | 4/1987 | Kolibas . |
| 4,774,680 | 9/1988 | Agar . |
| 4,778,631 | 10/1988 | Cobbs, Jr. et al. . |
| 4,779,762 | 10/1988 | Klein et al. . |
| 4,809,129 | 2/1989 | Hansen, III et al. . |
| 4,882,107 | 11/1989 | Cavender et al. . |
| 4,912,381 | 3/1990 | Culberson . |
| 4,923,720 | 5/1990 | Lee et al. . |
| 4,939,468 | 7/1990 | Takeuchi . |
| 5,009,367 | 4/1991 | Nielsen . |
| 5,027,742 | 7/1991 | Lee et al. . |
| 5,057,342 | 10/1991 | Hoy et al. . |
| 5,105,843 | 4/1992 | Condron et al. . |

FOREIGN PATENT DOCUMENTS

| | | |
|---|---|---|
| 0733732 | 5/1966 | Canada . |
| 0743666 | 9/1966 | Canada . |
| 0246797 | 11/1987 | European Pat. Off. . |
| 0259689 | 3/1988 | European Pat. Off. . |
| 0321607 | 6/1989 | European Pat. Off. . |
| 0350909 | 1/1990 | European Pat. Off. . |
| 0350910 | 1/1990 | European Pat. Off. . |
| 0388927 | 3/1990 | European Pat. Off. . |
| 0388915 | 9/1990 | European Pat. Off. . |
| 0388916 | 9/1990 | European Pat. Off. . |
| 0388923 | 9/1990 | European Pat. Off. . |
| 0492535 | 7/1992 | European Pat. Off. . |
| 0506067 | 9/1992 | European Pat. Off. . |

Primary Examiner—Timothy M. McMahon
Attorney, Agent, or Firm—Holland & Knight

[57] ABSTRACT

A method and apparatus for forming and dispensing a liquid coating material formulation or solution containing a nitrocellulose liquid coating composition and a supercritical fluid as a fluid diluent includes structure for combining the two components within a circuitous flow path or loop to form the coating material solution or formulation, while ensuring that the dissolved solids within the liquid coating composition do not precipitate and clog the supply of fluid diluent into the loop.

19 Claims, 1 Drawing Sheet

METHOD AND APPARATUS FOR PREVENTING THE FORMATION OF A SOLID PRECIPITATE IN A COATING MATERIAL FORMULATION

RELATED APPLICATIONS

This application is related to U.S. patent application Ser. No. 07/728,051 entitled "Method and Apparatus for Forming and Dispensing Single and Multiple Phase Coating Material Containing Fluid Diluent", filed Jul. 15, 1991 by Saidman et al, which is owned by the assignee of this invention.

FIELD OF THE INVENTION

This invention relates to coating systems, and, more particularly, to a method and apparatus for preventing the formation of a solid precipitate in a coating material formulation which includes a liquid coating composition containing dissolved solids and a fluid diluent such as supercritical carbon dioxide.

BACKGROUND OF THE INVENTION

A major problem in the furniture industry, both in terms of raw material usage and environmental effects, concerns the solvent content of nitro cellulose lacquer-based liquid coating compositions which are used as a protective coating for wood pieces of furniture. The resinous material contained in such nitrocellulose lacquer compositions is typically dissolved in an organic solvent provided with a viscosity suitable for spraying. This is required because it has been found that at each stage of the process for atomizing and conveying a resinous material in liquid form to a substrate, the liquid resists high speed deformation. Organic solvents are added to the resinous liquid because they have the effect of separating the molecules of resinous material and facilitating their relative movement making the solution more deformable at high speeds and therefore more susceptible to atomization. Substantial effort has been expended to reduce the volume of liquid solvent components in preparing high solid coating compositions, such as nitrocellulose lacquer-based compositions, but such compositions or formulations still typically contain as much as 60% or more by volume of liquid solvent components.

The problem with such a high volume content of liquid solvents in nitrocellulose coating compositions is that during handling, atomization or deposition of the coating composition, the solvents escape and can become air contaminants if not properly trapped. Once the coating composition is applied to a substrate, its solvents escape from the film by evaporation and such evaporated solvents can also contaminate the surrounding atmosphere. Additionally, since most solvents react with oxidants, pollution problems of toxicity, odor and smog may be created. Attempts at overcoming such environmental problems are proven to be costly and relatively inefficient.

The problem of high volume content of liquid solvents in coating compositions has been addressed, for example, in U.S. Pat. No. 4,923,720 to Lee et al. This patent discloses a method and apparatus for the production of a coating formulation in which a substantial amount of the liquid solvent component is removed and replaced with a supercritical fluid such as supercritical carbon dioxide which functions as a diluent to enhance the application properties of the coating formulation. The supercritical carbon dioxide and some liquid solvent material, e.g., about two thirds less than is required in other coating compositions, are intermixed with polymeric solids to form a coating material solution or formulation having a viscosity which facilitates atomization through an airless-type coating dispenser. As the coating material formulation is discharged from the dispensing devices toward a substrate, the supercritical carbon dioxide "flashes off" or vaporizes to assist in atomization of the high solids coating composition and to reduce drying time of the composition on the substrate. Such coating material formulation has the advantage of substantially reducing the adverse environmental effects caused by coating compositions having a high solvent content.

It has been observed that in the particular application of applying nitrocellulose lacquer-based liquid coating compositions onto wood pieces of furniture, problems have arisen as the result of the formation of a solid precipitate within the coating material formulation which plugs or blocks the dispensing system. As disclosed in the Lee et al U.S. Pat. No. 4,923,720, the supercritical carbon dioxide and liquid coating composition are supplied separately and intermixed within a "loop" or flow path which transmits the resulting coating material formulation to dispensers for discharge onto a substrate. The solid precipitate formed in the course of combining the supercritical carbon dioxide with the liquid coating composition to produce the nitrocellulose lacquer-based formulation clogs or blocks the valve or injector device which introduces the supercritical carbon dioxide into the loop. As a result, an insufficient volume of supercritical carbon dioxide is discharged into the loop and the resulting coating material formulation has an improper ratio of supercritical carbon dioxide to liquid coating composition. If sprayed onto a substrate with such improper ratio, the coating material formulation might not properly atomize and/or produce an unacceptable coating on the substrate.

The problem of forming a solid precipitate in the course of applying nitrocellulose lacquer-based formulations which include a supercritical fluid diluent has been addressed in U.S. Pat. No. 5,105,843 to Condron et al. This patent recognizes that the blockage or clogging problem occurs at the point of injection of the supercritical fluid into the system, and proposes the use of an isocentric, low turbulence injector to prevent the dissolved solids within the liquid coating composition from coming out of solution. This injector comprises a first tube carrying supercritical fluid which is concentrically disposed within a larger diameter second tube carrying the liquid coating composition. The liquid coating composition is directed in a laminar flow through the second tube, and the supercritical fluid is then introduced as a "core" fluid, i.e., at the center of the flow of liquid coating composition surrounding the first tube, so that the liquid coating composition and supercritical fluid are intermixed with a minimum of turbulence. This system therefore requires a particular construction of an injector for both the liquid coating composition and supercritical fluid, and the flow rates at which each material are combined with one another must be carefully controlled. In the event these flow rates are increased, which could be required if a relatively large number of coating dispensers must be supplied with the coating material formulation, it is believed that problems of turbulent flow may arise causing the formation of the undesired, solid precipitate.

SUMMARY OF THE INVENTION

It is therefore among the objectives of this invention to form a nitrocellulose lacquer-based coating material formulation by combining supercritical fluid with a liquid coating composition containing dissolved solids which avoids the formation of a solid precipitate within the coating material formulation.

These objectives are accomplished in a method and apparatus for forming and dispensing a liquid coating material formulation or solution containing a nitrocellulose liquid coating composition and a supercritical fluid as a fluid diluent which comprises means for supplying the liquid coating composition, means for supplying the fluid diluent, means for combining the two components within a circuitous flow path or loop to form the coating material solution or formulation and a control system for adjusting the relative quantity or volume of the two components introduced into the loop. Each of the means for supplying one of the components includes a control valve which is operatively connected to the control system so that selected quantities of each material are introduced into the loop in proper proportion to obtain the desired coating material formulation supplied to the coating dispensers. This invention is directed to methods of ensuring that the dissolved solids within the liquid coating composition do not precipitate and clog the control valve associated with the supply of fluid diluent into the loop.

One aspect of this invention is predicated upon the concept of avoiding the formation of a solid precipitate by introducing a compatabilizing solvent into at least one of the sources of fluid diluent and liquid coating composition before introduction of same into the circulation loop. It has been found that materials such as butyl cellosolve and various alcohols, when added in an effective amount to either the fluid diluent or liquid coating composition, substantially prevents the formation of solid precipitate within the coating material formulation circulating through the loop and therefore clogging or blockage of the control valve which emits fluid diluent into the loop is substantially avoided. In the presently preferred embodiment, the amount of butyl cellosolve or alcohol added to the fluid diluent is approximately at least about $\frac{1}{2}$% by volume of the fluid diluent introduced into the loop. Alternatively, an amount of at least about 4% of compatablizing agents such as butyl cellosolve or alcohol is added to the liquid coating composition prior to its introduction into the loop to obtain a sufficient quantity of compatablizing solvent within the coating material formulation to avoid the formation of a solid precipitate.

Another method of eliminating, or at least substantially reducing, the formation of a solid precipitate within the coating material formulation involves supplying a supercritical fluid such as supercritical carbon dioxide as the fluid diluent, and heating such supercritical carbon dioxide at least slightly beyond its critical temperature prior to introduction into the circulating loop and preferably above the temperature of the fluid in the loop. When using supercritical carbon dioxide as the fluid diluent, for example, a heater is interposed between a source of liquid carbon dioxide and the control valve for the fluid diluent which is effective to heat the liquid carbon dioxide to a temperature of at least 120° F. thus converting it to supercritical carbon dioxide prior to introduction into the loop through the control valve. In addition to such temperature control of the fluid diluent, it has been found advantageous to also maintain the pressure of the coating material formulation within the loop at the injection point of the supercritical fluid therein at a level only slightly above the supercritical pressure of the supercritical fluid used as the fluid diluent. When using supercritical carbon dioxide, for example, the pressure of the coating material formulation within the loop is preferably maintained at a level of less than about 1,300 psi in order to eliminate the formation of the solid precipitate.

This invention therefore provides methods for eliminating, or at least substantially reducing, the formation of a solid precipitate within a cellulose lacquer-based coating material formulation, each of which involve easily controlled parameters which can be maintained regardless of the volume of coating material formulation required for a particular application.

DESCRIPTION OF THE DRAWINGS

The structure, operation and advantages of the presently preferred embodiment of this invention will become further apparent upon consideration of the following description, taken in conjunction with the accompanying FIGURE which is a schematic, block diagram of the apparatus of this invention.

DETAILED DESCRIPTION OF THE INVENTION

Figure 1:
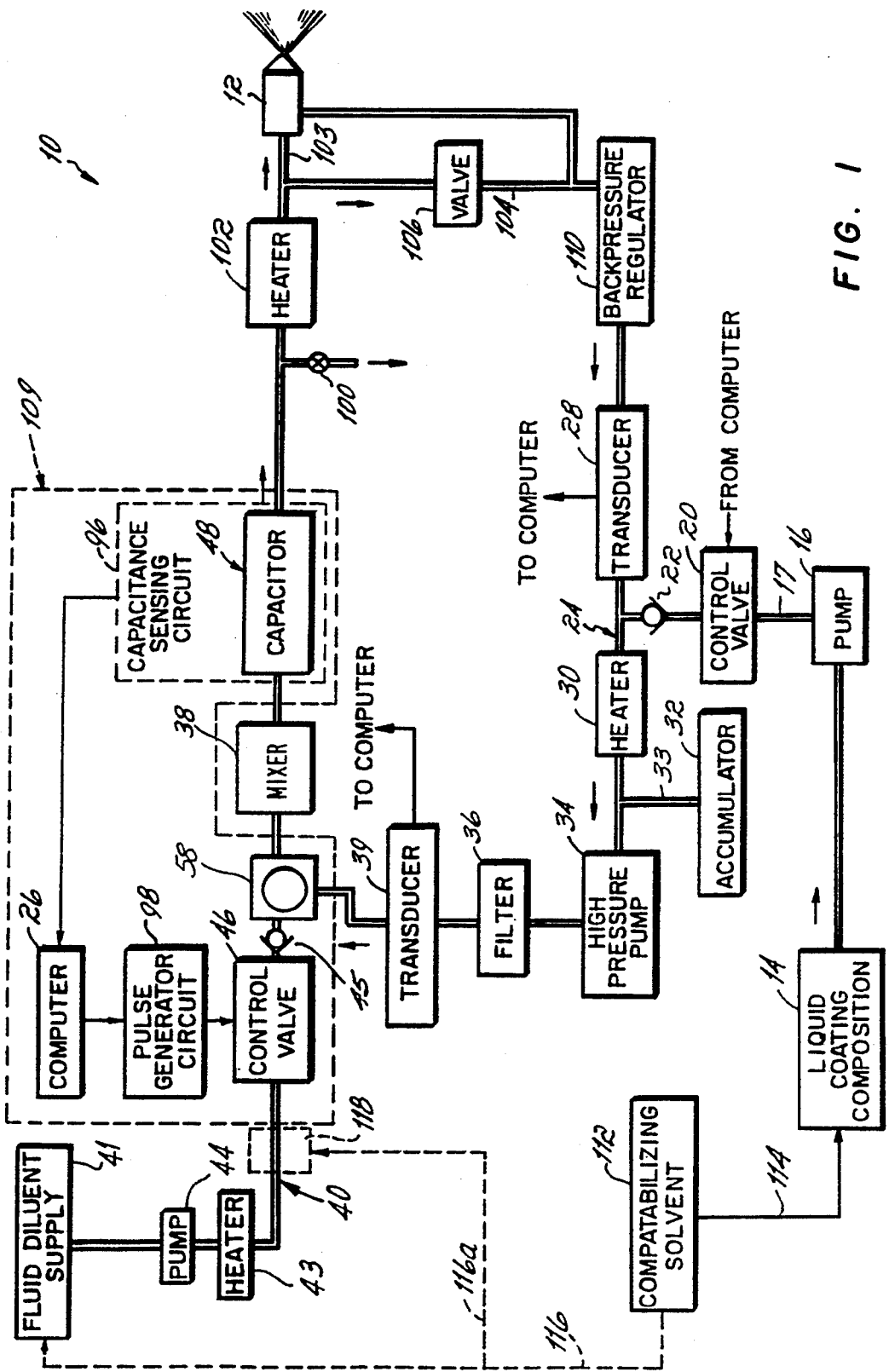

The detailed construction and operation of the dispensing system 10 illustrated in FIG. 1 forms no part of the method of this invention, except for specific aspects thereof as discussed below, and reference should be made to U.S. patent application Ser. No. 07/728,051, to Saidman et al, filed Jul. 15, 1991, entitled "Method and Apparatus For Forming and Dispensing Single and Multiple Phase Coating Material Containing Fluid Diluent", which is owned by the assignee of this invention, the disclosure of which is incorporated by reference in its entirety herein. For purposes of the present discussion, the system 10 is specifically intended to form a coating material solution or formulation in which a liquid coating composition and a supercritical fluid are intermixed in a controlled manner to form a liquid coating material solution or formulation which is transmitted to one or more coating dispensers 12 for deposition onto a substrate (not shown). The term "liquid coating composition" as used herein refers to a nitrocellulose lacquer-based resin, including a solvent component and dissolved "solids", e.g., polymers, where a portion of the solvent component is being replaced with a fluid diluent such as supercritical fluid to reduce solvent emissions. The term "supercritical fluid" as used herein is intended to refer to a gas in a supercritical state above its critical pressure and critical temperature wherein the gas has a density approaching that of a liquid material. It is also contemplated that liquified gases could be utilized in forming the liquid coating material formulation, and it should therefore be understood that the term "liquified gas" may be substituted for the term "supercritical fluid" in the foregoing description. The term "fluid diluent" as used herein is meant to refer interchangeably to supercritical fluids and liquified gases. The terms "coating material solution" and/or "coating material formulation" are used synonymously to refer to the combination of the fluid diluent and liquid coating composition, e.g. laquer based nitrocellulose formulations, wherein the fluid diluent is substantially dissolved in the liquid coating composition to form a solution, or at least an emulsion or dispersion.

A "coating dispenser" as used refers to an airless-type spray gun capable of handling the fluid pressures used in this system. Preferably, the dispensers are airless spray guns of the type disclosed in co-pending U.S. patent application Ser. No. 07/416,855, entitled "Method and Apparatus For Spraying A Liquid Coating Containing Supercritical Fluid or Liquified Gas", filed on Oct. 4, 1989, which is hereby incorporated by reference in its entirety herein. Alternatively, air-assisted air-less-type spray guns could be used such as are shown in U.S. Pat. No. 3,843,052 to Cowan. Air-assisted airless spray guns may have the advantage of including auxiliary air jets which could be used to shape or confine the spray pattern which is typically wider than normal airless spray patterns due to the flashing off of the supercritical fluid as it goes to ambient pressure and temperature upon exiting the spray nozzle.

The purpose of the supercritical fluid and/or liquified gas is to act as a fluid diluent for the coating composition so that the proportion or percentage of organic solvents in the liquid coating composition can be reduced, e.g., by about two-thirds, compared, for example, to most commercially available high solids liquid coating compositions. A number of compounds in a supercritical or liquified state can be intermixed with a liquid coating composition to produce the coating material solution or formulation obtained by the apparatus of this invention. These compounds include carbon dioxide, ammonia, water, nitrogen oxide ($N_2O$), methane, ethane, ethylene, propane, butane, pentane, methanol, ethanol, isopropynol, isobutanol, chlorotrifluoromethane, monofluoromethane and others. For purposes of the present discussion, supercritical carbon dioxide is employed because of its non-toxic nature and because its critical temperature and critical pressure of 85° F. and 1070 psi, respectively, are well within the operating ranges of standard airless spraying systems including the system 10 of this invention.

The overall construction of the system 10 is first discussed below, followed by a description of its operation with different types of liquid coating compositions.

OVERALL CONSTRUCTION OF SYSTEM 10

Referring to the FIGURE, liquid coating composition is drawn from a tank 14 by a pump 16. The pump 16 can be any suitable piston pump, such as a Model 64B pump sold by Nordson Corporation of Amherst, Ohio, which is capable of pressurizing the liquid coating composition to a pressure of at least about 1350 to 1400 psi.

The liquid coating composition is discharged from pump 16 into an input line 17, carrying a control valve 20 and a check valve 22, and this input line 17 intersects a main circulation line or circulation loop 24 of the system 10. The control valve 20 is preferably of the type sold under Model No. 912A-PM-11CA by Whitey Company of Highland Heights, Ohio, and is operatively connected to a computer 26. The pressure of the material flowing in the circulation loop 24 in the area of the intersection of input line 17 and circulation loop 24 is monitored by a pressure transducer 28 carried within the circulation loop 24. The pressure transducer 28 provides an output to computer 26 corresponding to the sensed pressure thereat, for purposes to become apparent below. The pressure transducer is preferably of the type such as Model No. 246341 sold by Omega Engineering, Inc., of Stamford, Conn.

Moving in the direction of flow within the circulation line 24, i.e., clockwise as viewed in FIG. 1, a heater 30 is located in the circulation loop 24 downstream from the pump 16 which is preferably of the type sold under Model No. NH4 by Nordson Corporation of Amherst, Ohio. An accumulator 32 of the type sold under Model No. BD05A214 by Parker Hannifin Corp., of Hillsborough, N.C. is carried in a branch line 33 connected to circulation loop 24. The branch line 33 and accumulator 32 are located between the heater 30 and a high pressure, piston pump 34 such as a Nordson Model HP pump, made by Nordson Corporation of Amherst, Ohio. The high pressure pump 34 increases the pressure of the formulation and discharges it through a filter 36 to a mixer 38. The filter 36 is preferably a Part No. 161510 filter, sold by Nordson Corporation of Amherst, Ohio or a suitable equivalent, which is capable of filtering impurities having a transverse dimension of about 0.02 inches or higher. Preferably, the mixer 38 includes a tortuous flow path which combines the liquid coating composition and fluid diluent, and disperses any bubbles, as described below. A pressure transducer 39, identical to transducer 28, is located in circulation loop 24 downstream from filter 36 to sense the output pressure of high pressure pump 34, for purposes to become apparent below.

In the embodiment of system 10 illustrated in FIG. 1, the circulation loop 24 is intersected by a supply line 40 at a point upstream from the mixer 38 and downstream from where the liquid coating composition enters the circulation loop 24. This supply line 40 receives fluid diluent, e.g., liquified carbon dioxide, at a pressure of about 800 psi and temperature of about 75° F. (ambient) from a metal cylinder or tank 41. The liquified carbon dioxide is directed through supply line 40 to a pump 44 which increases the pressure of the liquified carbon dioxide in the range of about 1100 to 1300 psi, and preferably below about 1300 psi, for purposes discussed below in connection with a description of the method of operation of system 10. Preferably, the pump 44 is a Haskell pump Model DSF35 sold by the Haskell Company of Burbank, Calif.

In the presently preferred embodiment, the liquified carbon dioxide is discharged from pump 44 into a heater 43 which is positioned in the supply line 40 between the pump 44 and the control valve 46. This heater is preferably a Model NH4 heater sold by Nordson Corporation of Westlake, Ohio. The heater 43 increases the temperature of the liquified carbon dioxide to at least about 120° F., which is well above the 85° F. critical temperature of supercritical carbon dioxide. Because the pump 44 increases the pressure of the liquified carbon dioxide to about 2000 psi, the liquified carbon dioxide is converted to the supercritical state after flowing through the heater 43.

The now supercritical carbon dioxide is discharged from the heater 43 into line 40 and enters a control valve 46 which is preferably a Model No. SSHB54 manufactured by the Whitey Company of Highland Heights, Ohio. From the control valve 46, the supercritical carbon dioxide flows through a check valve 45 into the circulation loop 24 immediately upstream from the mixer 38. Preferably, a sight glass 58 is positioned at the injection point of the supercritical carbon dioxide, i.e., at the intersection of line 40 and circulation loop 24, which can be used to provide a visual indication of whether solids or other forms of a second phase are being formed within the solution. The supercritical carbon dioxide is intermixed with the liquid coating composition within the mixer 38 to produce the coating material formulation supplied to the coating dispensers 12. The coating material formulation formed in mixer 38 is then transmitted through circulation loop 24 into a capacitor 48 of the type described in detail in U.S. patent application Ser. No. 07/728,051 mentioned above. As described in that patent application, the capacitor 48 is effective to sense the capacitance, or dielectric constant, of the coating material formulation emitted from the mixer 38. The capacitance or dielectric constant of the formulation can be correlated to the content of the fluid diluent, e.g., the relative proportion of supercritical carbon dioxide contained within the formulation. The capacitor 48 forms part of an electrical circuit such as a capacitance bridge or capacitance sensing circuit 96, for example, which produces an output dependent on the sensed capacitance, and this output is accepted as an input by the computer 26. The computer 26, in turn, drives a pulse generator circuit 98 which controls the duty cycle of control valve 46 associated with the supply of fluid diluent. As described in detail in Ser. No. 07/728,051, the capacitor 48, capacitance sensing circuit 96, computer 26, pulse generator circuit 98 and control valve 46 collectively comprise a control system 109 operative to ensure that the content of supercritical carbon dioxide within the coating material solution is properly controlled. This control function forms no part of this invention of itself and is therefore not described in detail herein. Reference should be made to U.S. patent application Ser. No. 07/728,051 for a detailed discussion of same.

A dump valve 100 and a second heater 102 are located between the capacitor 48 and the coating dispensers 12 which are connected by a discharge line 103 to the circulation loop 24. In the embodiment illustrated in the FIGURE, a bypass line 104 having a valve 106 is located between the second heater 102 and coating dispenser 12 to receive at least a part of the flow of coating material solution which would otherwise be transmitted through discharge line 103 to the coating dispensers 12. Preferably, the valve 106 is set so that about 25% of the flow of solution bypasses the coating dispensers 12 and enters bypass line 104. A circulation line 108 extends from the coating dispensers 12 to a back pressure regulator 110 which is located in the circulation loop 24 immediately upstream from the pressure transducer 28 described above. The recirculation line 108 receives solution from the coating dispenser 12 when it is shut off or operated intermittently.

METHOD OF OPERATION TO ELIMINATE SOLID PRECIPITATES

As mentioned above, a problem had arisen when forming and dispensing nitrocellulose lacquer-based coating material formulations including a nitrocellulose liquid coating composition containing dissolved solids and a supercritical fluid diluent such as supercritical carbon dioxide. Specifically, it was found that upon combination of the supercritical carbon dioxide and nitrocellulose liquid coating composition within the circulation loop 24, at least some of the dissolved solids would crystallize and form a solid precipitate. This solid precipitate would clog or block the control valve 46, check valve 45 and/or the supply line 40 where the supercritical carbon dioxide is introduced into the circulation loop 24 for combination with the liquid coating composition. As a result of this clogging or blockage, an insufficient quantity of supercritical carbon dioxide is introduced into the circulating loop 24 and the resulting nitrocellulose coating material formulation does not have the proper ratio of supercritical fluid diluent to liquid coating composition.

This invention is predicated upon the concept of eliminating or at least substantially reducing the formation of a solid precipitate and nitrocellulose lacquer-based coating material formulations by (1) adjusting temperature and pressure parameters within the system 10, and/or (2) adding a compatablizing solvent to either one of the supercritical carbon dioxide or liquid coating composition.

Considering first the control of temperature and pressure parameters within the system 10, it has been found that the liquified carbon dioxide supplied from tank 41 should be heated to a temperature of at least about 120° F. by heater 43 so that it is introduced in the supercritical state into the circulating loop 24. Additionally, the heaters 30 and 102 within the circulation loop 24 are also operated to maintain the formulation at a similar or slightly lower temperature, i.e., about 120° F., to ensure that the carbon dioxide is maintained in a supercritical state within the circulation loop 24. The introduction of the carbon dioxide into the circulation loop 24 through line 40 in the supercritical state, and the maintenance of the carbon dioxide in the supercritical state within loop 24, has proven to be effective in at least reducing if not eliminating the formation of a crystallized or solid precipitate from the coating material formulation. As a result, the control valve 46, check valve 45 and/or discharge end of line 40 are substantially prevented from clogging or other blockage which would reduce the flow of supercritical carbon dioxide into the loop 24.

In addition to control of the temperature of the supercritical carbon dioxide, it has been found advantageous to maintain the pressure within system 10 at a level only slightly in excess of the critical pressure of the fluid diluent. When using carbon dioxide, for example, which has a critical pressure of 1070 psi, it is preferable to maintain the pressure within line 40 and circulation loop 24 at a level not to exceed about 1300 psi. Such control of the pressure is obtained within the line 40 by proper adjustment of pump 44, and is maintained in circulation loop 24 by appropriate adjustment of the high pressure pump 34 and back pressure regulator 110. It has been found that such control of the temperature and pressure conditions within line 40 and loop 24 is effective to substantially prevent or at least reduce the formation of a solid precipitate from the cellulose lacquer-based formulation.

As mentioned above, another means employed by this invention for the reduction or elimination of solid precipitates is to add a compatablizing solvent to either the fluid diluent or liquid coating composition supplies. This is depicted schematically in the FIGURE where the reference number 112 indicates a source of a compatablizing solvent which is supplied via a line 114 to the source of liquid coating composition 14, or, alternatively, via lines 116 or 116a to the supply of liquified carbon dioxide. (See phantom lines in the FIGURE). The purpose of the compatablizing solvent is to maintain the dissolved solids in solution within the nitrocellulose formulation and substantially prevent the solvents from precipitating solids from solution. Suitable compatablizing agents include glycol-ethers such as butyl cellosolve, acetates, aldehydes, various ketones and alcohols such as methanol and higher weight alcohols. It is believed that these solvents prevent the formation of a solid precipitate because they make the formulation more hydrocarbon tolerant, and because such solvents are only slightly soluble in supercritical carbon dioxide. As a result, solvents are not stripped away from the formulation, but remain in solution and substantially prevent the crystallization of dissolved solids within the nitrocellulose formulation.

The FIGURE schematically depicts the addition of compatablizing solvent 112 through line 114 directly to the source of liquid coating composition 14. It is also contemplated that the compatablizing solvent 112 could be added by the manufacturer of the liquid coating composition and supplied as a mixture to form the source of liquid coating composition 14 as represented in the FIGURE Alternatively, the compatabilizing solvent could be injected directly into the circulating loop of the FIGURE such as into line 24 between transducer 28 and heater 30. In the presently preferred embodiment, the amount of butyl cellosolve added to the liquid coating composition should be on the order of at least about 4% by volume. This mixture is then discharged from the liquid coating composition source 14 into the circulation loop 24 as discussed above.

It is contemplated that the addition of compatabilizing solvent 112 to the supercritical carbon dioxide could be accomplished in a number of ways. One manner of combination is depicted by line 116 wherein the compatablizing solvent is added directly to the tank 41 of liquified carbon dioxide and intermixed therewith prior to discharge into the mass flow meter 42. Alternatively, the compatablizing solvent can be introduced through line 116a into a tank 118 through which the supercritical carbon dioxide passes before it flows into the control valve 46 and check valve 45. In the course of passage through the tank 118, the supercritical carbon dioxide is combined with the compatablizing solvent, such as butyl cellosolve, and then introduced into the circulation loop 24. In either of these alternative methods of combining the compatablizing solvent with the supercritical carbon dioxide, the compatablizing solvent preferably constitutes at least about ½% by volume of the total flow of supercritical carbon dioxide supplied from the line 40 into the circulation loop 24.

This invention therefore contemplates the reduction or elimination of solid precipitates from nitrocellulose lacquer-based solutions by the methods described above which can be employed individually or in combination with one another. It is contemplated that the above-described temperature adjustment, i.e., wherein the liquified carbon dioxide is heated to greater than about 120° F. within the line 40 and maintained at that temperature in circulation loop 24, could be utilized independently of the adjustment of the pressure within the system 10 and/or the addition of the compatablizing solvent 112. Improved or at least equal results are achieved by adjusting both the temperature and pressure parameters of the system 10 as described above, i.e., by maintaining the temperature at 120° F. or greater and holding the system pressure preferably not more than about 1300 psi. The alternative method described above, wherein a compatabilizing solvent is added to either the supply of fluid diluent or liquid coating composition, can be employed independently or in combination with the temperature and/or temperature-pressure adjustment methods mentioned above. These measures, alone or in combination with one another, enable nitrocellulose formulations to be utilized in the system 10 with the attendant benefits of a substantial reduction in the use of organic solvents.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. Apparatus for preventing the formation of a solid precipitate in a system for dispensing a coating material formulation, comprising:

first supply means for supplying supercritical carbon dioxide;

second supply means for supplying a nitrocellulose, lacquer-based liquid coating composition containing dissolved solids;

combining means, connected to said first and second supply means, for combining the supercritical carbon dioxide as a fluid diluent with the nitrocellulose, lacquer-based liquid coating composition containing dissolved solids to form the coating material formulation;

means, connected to at least one of said first and second supply means, for combining a compatabilizing solvent with at least one of the supercritical carbon dioxide and nitrocellulose, lacquer-based liquid coating composition in an effective amount to substantially prevent the formation of a solid precipitate in the coating material formulation.

2. The apparatus of claim 1 in which said means for combining a compatablizing solvent includes means for adding an amount of at least about ½% by volume of compatablizing solvent with the supercritical carbon dioxide.

3. The apparatus of claim 1 in which said means for combining a compatablizing solvent includes means for adding an amount of at least about 4% by volume of compatablizing solvent with the nitrocellulose, lacquer-based liquid coating composition.

4. The apparatus of claim 1 in which said means for combining a compatabilizing solvent includes means for supplying a quantity of butyl cellosolve.

5. Apparatus for preventing the formation of a solid precipitate in a coating material formulation, comprising:

combining means for intermixing a liquid coating composition containing dissolved solids and a supercritical fluid diluent to form the coating material formulation;

first supply means for supplying the liquid coating composition to said combining means;

second supply means for converting a liquified fluid diluent to said supercritical fluid diluent, and for then supplying said supercritical fluid diluent to said combining means to form the coating material formulation.

6. The apparatus of claim 5 in which said second supply means includes a heater for increasing the temperature of the liquified fluid diluent to at least the critical temperature thereof, and a pump for increasing the pressure of the liquified fluid diluent to at least the critical pressure thereof.

7. The apparatus of claim 6 in which said liquified fluid diluent is liquified carbon dioxide, said pump being effective to increase the pressure of the liquified carbon dioxide to a level of about 1100 psi.

8. The apparatus of claim 6 in which said liquified fluid diluent is liquified carbon dioxide, said heater being effective to heat the liquified carbon dioxide to a temperature of about 120° F.

9. Apparatus for preventing the formation of a solid precipitate in a coating material formulation, comprising:

combining means for intermixing a liquid coating composition containing dissolved solids and a supercritical fluid diluent to form the coating material formulation;

first supply means for supplying the liquid coating composition to said combining means;

second supply means for increasing the temperature of a liquified fluid diluent to form supercritical fluid diluent, and for then supplying the supercritical fluid diluent to said combining means to form the coating material formulation.

10. The apparatus of claim 9 in which the liquified fluid diluent is liquified carbon dioxide, said second supply means including a heater which is effective to increase the temperature of the liquified carbon dioxide to about 120° F.

11. Apparatus for preventing the formation of a solid precipitate in a coating material formulation, comprising:

combining means for combining supercritical carbon dioxide as a fluid diluent with a nitrocellulose, lacquer-based liquid coating composition containing dissolved solids to form the coating material formulation;

first supply means for supplying the liquid coating composition to said combining means;

second supply means for converting liquified carbon dioxide to supercritical carbon dioxide, and for then supplying said supercritical carbon dioxide to said combining means to form the coating material formulation;

means for combining a compatablizing solvent with at least one of the supercritical carbon dioxide and nitrocellulose, lacquer-based liquid coating composition in an effective amount to substantially prevent the formation of a solid precipitate in the coating material formulation.

12. The apparatus of claim 11 in which said means for combining a compatablizing solvent includes means for adding an amount of at least about ½% by volume of compatablizing solvent with the supercritical carbon dioxide.

13. The apparatus of claim 11 in which said means for combining a compatablizing solvent includes means for adding an amount of at least about 4% by volume of compatablizing solvent with the nitrocellulose, lacquer-based liquid coating composition.

14. The apparatus of claim 11 in which said means for combining a compatablizing solvent with at least one of the fluid diluent and liquid coating composition comprises means for combining a compatablizing solvent chosen from the group of glycol-ethers, acetates, aldehydes, ketones and alcohols with at least one of the supercritical carbon dioxide and liquid coating composition.

15. The apparatus of claim 11 in which said means for combining a compatablizing solvent with at least one of the supercritical carbon dioxide and liquid coating composition comprises means for combining an amount of at least about 4% by volume of compatablizing solvent with the liquid coating composition.

16. The apparatus of claim 11 in which said means for combining a compatablizing solvent with at least one of the supercritical carbon dioxide and liquid coating composition comprises means for combining an amount of at least about 4% by volume of butyl cellosolve with the liquid coating composition.

17. The apparatus of claim 11 in which said second supply means includes a heater for increasing the temperature of the liquified carbon dioxide to at least the critical temperature thereof, and a pump for increasing the pressure of the liquified carbon dioxide to at least the critical pressure thereof.

18. The apparatus of claim 17 in which said pump is effective to increase the pressure of the liquified carbon dioxide to a level of about 1100 psi.

19. The apparatus of claim 17 in which said heater is effective to increase the temperature of the liquified carbon dioxide to about 120° F.

* * * * *